United States Patent

[11] 3,560,660

[72] Inventors Isidoro Poretti
Castiglione;
Gianmario Costa, Cornaredo, Italy
[21] Appl. No. 783,860
[22] Filed Dec. 16, 1968
[45] Patented Feb. 2, 1971
[73] Assignee Societa Italiana Telecomunicazioni Siemens s.p.a.
Milan, Italy
a corporation of Italy
[32] Priority Dec. 14, 1967
[33] Italy
[31] 23,856-A/67

[54] TIME-ALLOCATION COMMUNICATION SYSTEM WITH SCRAMBLING NETWORK
10 Claims, 5 Drawing Figs.

[52] U.S. Cl. 179/15
[51] Int. Cl. H04k 1/00
[50] Field of Search 179/15, 15(AT), 15A, 15(APC), 15(SIG)

[56] References Cited
UNITED STATES PATENTS 2,412,964 12/1946 Chatterjea 179/15X
3,372,237 3/1968 Hackett 179/15

*Primary Examiner*—Ralph D. Blakeslee
*Attorney*—Karl F. Ross

ABSTRACT: Telephone communication system wherein two groups of subscribers, associated with opposite terminals of a two-way trunk line, are selectively connectable to that trunk line for transmission or reception under the control of a train of stepping pulses generated during a signal-transmission period of an operating cycle or frame, the number $m''$ of stepping pulses in that train (and therefore the number of subscriber lines so connectable in any one frame) being half the total number of subscribers in each group. A distribution signal, sent out at the beginning of a frame during an allocation period, consists of a succession of address pulses identifying the calling subscribers whose message samples are transmitted in coded form during the following transmission period. The stepping pulses are fed to a scrambler which, under the control of a random selector responsive to the combination of code pulses in the first several message samples transmitted during an immediately preceding frame, suppresses a continuously varying number of stepping pulses in the original train to give rise to a modified train with a reduced number $m \geqslant w$ of stepping pulses, $w$ being the number of subscribers to be connected as determined from a count of address pulses in the distribution signal immediately preceding such transmission. The $(m—w)$ supernumerary stepping pulses left over after the transmission of the $w$ message samples are used to test hitherto idle subscribers for possible inclusion of their message samples during the next frame. During the occurrence of these supernumerary stepping pulses, as well as between the termination of the foreshortened pulse train and the end of the transmission period, a noise code generator is connected to the trunk to transmit spurious message signals which at the receiving terminal are weeded out by an unscrambler under the control of another random selector responsive to the same combination of code pulses as the selector at the transmitting terminal.

Isidoro Poretti
Gianmario Costa
INVENTORS.

BY

Karl F. Ross
Attorney

Isidoro Poretti
Gianmario Costa
INVENTORS.

BY

Karl F. Ross
Attorney

Inventors:
Isidoro Poretti
Gianmario Costa

INVENTORS:
Isidoro Poretti
Gianmario Costa

BY

Karl F. Ross
Attorney

TIME-ALLOCATION COMMUNICATION SYSTEM WITH SCRAMBLING NETWORK

Our present invention relates to a two-way communication system, specifically a telephone system, of the general type disclosed in commonly owned U.S. Pat. application Ser. No. 636,164 filed May 4, 1967, now Pat. No. 3,548,103 by Fabio Balugani, Franco Mammucari and Isidoro Poretti, i.e. a system in which signals from simultaneously communicating (e.g. talking) subscribers on one end of a common trunk line are sampled to produce information which, in coded form, is consecutively transmitted over the trunk line to a remove terminal within a short operating interval, preferably on the order of 100 microseconds, for distribution to respective subscriber lines at the other end. Such systems, which are also the subject matter of commonly owned U.S. Pat. application Ser. No. 445,333 filed Apr. 19, 1956, have become known as time-sharing or time-allocation systems.

Generally, in such systems, the signal levels of all the subscriber lines associated with a transmitting terminal are tested more or less periodically to determine which of these lines are to be connected to the trunk during an immediately following transmission period. In practice, even at full capacity operation, not more than half the number of available subscriber lines (on the average) will be used for transmission whereas the remainder are employed for reception; thus, with $n$ representing the number of subscribers at either end, only $n/2$ channels need to be provided for traffic in each direction.

Thus, as described in prior application Ser. No. 636,164 and in Italian Pat. No. 765,486, there may be generated during each transmission period a train of $n/2$ stepping pulses which actuate a counting chain to cause the transmission of a like or lesser number of stored message samples in coded form; any supernumerary stepping pulses in that train, after the transmission of the last code combination, are used to test hitherto idle subscriber lines in a predetermined order of succession to determine if the signal level thereon has risen sufficiently to require transmission of their message samples during the next operating cycle or frame. Conversely, if the signal level of any subscriber line drops below a certain threshold for a predetermined number of cycles, that line is cut off until it becomes active again. The resulting turnover shifts the positions of the transmitting subscribers during consecutive frames so as to provide a degree of safety from possible interception of their messages, particularly at full load. When traffic is light, however, this advantage is less apparent; thus, a single talking subscriber will always be assigned the No. 1 channel in the counting chain and even a small number of active subscribers will find themselves sharing the first few channels so that their messages are sampled with a nearly constant repetition frequency substantially equal to the frame cadence (e.g. 10,000 cycles per second), making interception relatively easy.

It is, therefore, the general object of our present invention to provide an improved system of the aforedescribed character which ensures full privacy to any talking subscriber regardless of load conditions and irrespectively of the position of his line in the counting chain.

This object is realized, pursuant to our present invention, by the provision of complementary scrambling and unscrambling units at the transmitting and receiving terminals, each of these units including means for suppressing a continuously varying number of stepping pulses in the original train, under the control of an associated random selector, to give rise to a modified train with a reduced number $m$ of stepping pulses, as compared with the invariable original number $m''$ (generally equal to $n/2$) of such pulses, care being taken that the reduced number $m$ be at least equal to the number $w$ of active subscribers waiting to have their message samples coded and transmitted in the corresponding frame. The $(m-w)$ supernumerary pulses, if any, are again used at the transmitting terminal to select hitherto idle subscribers for subsequent sampling. The gaps occurring in the foreshortened pulse train, on account of the suppression of original stepping pulses, are occupied by spurious signals from a noise code generator which is activated whenever no message samples are being transmitted, thus also during preselection as well as between the termination of that train and the end of the transmission period. At the receiving terminal the same pattern of selective suppression is used to weed out the spurious message signals so that only the true code combinations are decoded and transmitted to the receiving lines identified by a distribution signal transmitted during an allocation period at the beginning of the frame.

It is, of course, essential that the same pattern of random suppression be available during a given frame at both the transmitting and the receiving terminal. It is also desirable that this pattern be as unpredictable as possible and that no separate channel be required for its transmission. Both these requirements are satisfied, in accordance with a further feature of our invention, by the utilization of certain code combinations from an immediately preceding frame as the pattern, in combination with means for counting the code pulses in the distribution signal of the current frame and superimposing the resulting count upon the output of the random selector to ensure the availability of a sufficient number of stepping pulses for reading out the message samples of the $w$ active subscribers. With 48 subscriber lines associated with each terminal, for example, the original pulse train contains $m'' = 24$ stepping pulses which can be marked for selective suppression by the code combinations from not more than three or four transmission channels, depending on the number of bits in each binary word representing a coded message sample.

In practice it will be convenient (though not essential) to use the codes from the first several channels as the master for the pattern of selection; these chosen channels may carry either genuine or spurious message codes. Since the contents of these channels depend on the codes transmitted thereover in a preceding frame, faulty transmission of even a single bit may lead to garbling of subsequent codes. According to another feature of our invention, therefore, we provide a recurrent pause in the operation of the random selector so that, during certain frames, no stepping pulses are suppressed and the true signals appear, in order, without intervening noise codes so that the counting chains at the two terminals are positively correlated. Such pause may recur with a frequency on the order of, say, one-tenth the frame cadence so that, typically, every tenth frame contains a deactivation signal for the random selector of the scrambling and unscrambling networks.

The system according to our invention thus provides, in each frame, a full complement of $n/2$ transmitted code combinations which may in part be spurious noise signals interleaved with genuine message codes; the presence of these noise signals, and the unpredictability of their occurrence and distribution, effectively prevents interception of the message of any participating subscriber by equipment lacking a properly attuned unscrambler as herein described.

The invention will be explained in greater detail hereinafter with reference to the accompanying drawing in which:

FIGS. 1 (*a*) and 1 (*b*) are views similar to the corresponding FIGS. of application Ser. No. 636,164 showing, respectively, the transmitting section and the receiving section of a trunkline terminal embodying our present improvement;

Figure 1B:
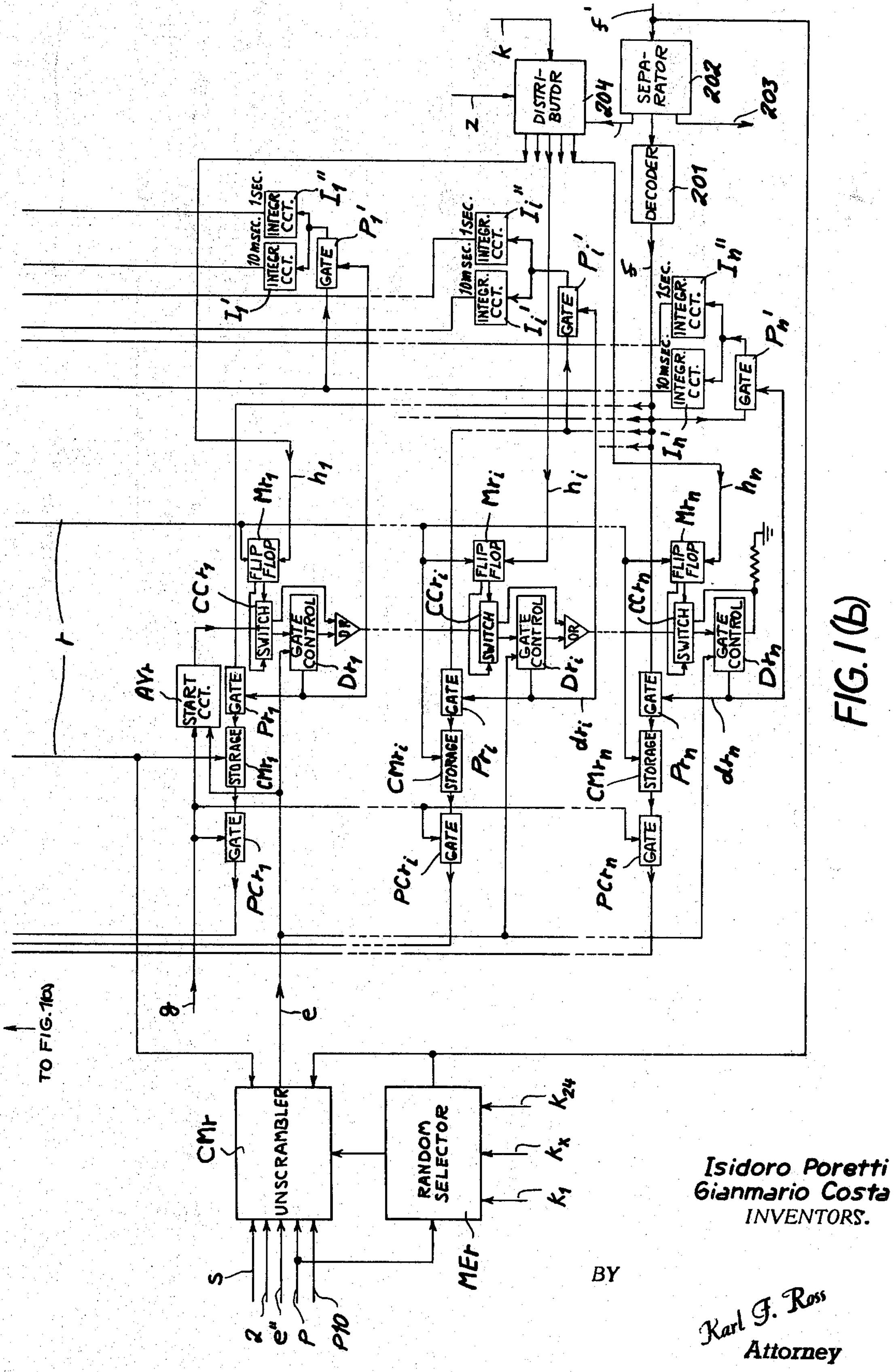
Figure 1A:
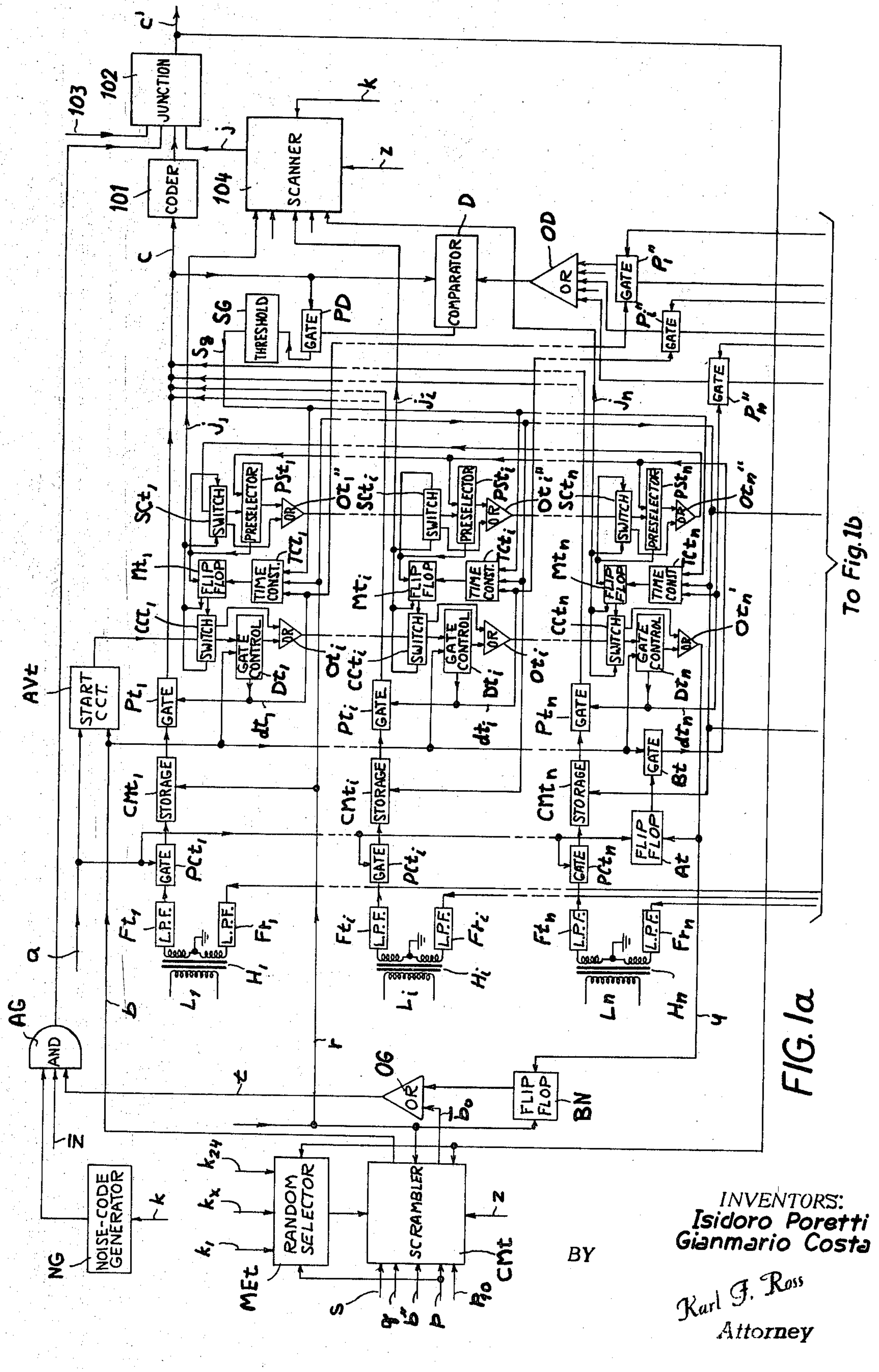

We shall first describe, with reference to FIGS. 1 (*a*) and 1 (*b*), the terminal equipment of the system of application Ser. No. 636,164 to the extent of its applicability to the present improvement. As in the prior application, the elements of the transmitting section are identified by the postscript "*t*" whereas those of the receiving section bear the postscript "*r*."

Of the $n$ subscriber lines served by this terminal, only the first line $L_1$, an intermediate line $L_i$ and the last line $L_n$ have been shown. Components individual to these several lines have been identified by subscripts "1," "$i$" and "$n$," respectively. Since these components are identically duplicated in each subscriber circuit, only the components associated with line $L_i$ will be described in detail hereinafter.

The term "subscriber line," as used herein, denotes local lines originating at the terminal and giving access, via the usual line finders and selector switches, to calling and called subscribers.

A two-way trunk line associated with the terminal of FIGS. 1 ($a$) and 1 ($b$) has been represented by a conductor $c$ and its extension $c'$, forming part of a transmission channel, and a conductor $f$ with extension $f'$, forming part of a reception channel. Included in these channels is conventional coding and decoding equipment 101, 201 for translating a potential on conductor $c$ into a combination of outgoing code pulses on lead $c'$ and reconverting an incoming combination of such code pulses on lead $f'$ into a signal voltage on conductor $f$. Other conductors common to all subscriber lines are a load $a$ for the transmission of sampling pulses A (see also FIG. 4); a lead $b$ for the delivery of stepping pulses B to the transmitting section; a lead $r$ serving as a source of cancellation and synchronizing pulses R; a lead $e$ for the delivery of stepping pulses E to the receiving section; and a lead $g$ for the supply of gating pulses G to pass the signal voltages from the receiving section to individual subscriber lines. Also included are individual leads $j_1, \ldots j_i, \ldots j_n$ for the delivery of outgoing address signals to the remote terminal via the transmission lead $c'$ of the trunk and $h_1, \ldots h_i, \ldots h_n$ for the distribution of incoming address signals from the reception lead $f'$ to the several subscriber circuits. The generation of the several types of pulses is under the control of a timer or clock circuit of which only the above-enumerated leads and others, described later, have been illustrated.

Line $L_i$ is connected via a hybrid coil $H_i$ to an outgoing branch, comprising a low-pass filter $Ft_i$, and an incoming branch, comprising another low-pass filter $Fr_i$. Filter $Ft_i$, designed to suppress transients, works through a gate $PCt_i$ into a storage circuit $CMt_i$. This circuit, essentially a condenser shunted bv a normally blocked discharge gate, stores a potential representing an amplitude sample of an audiofrequency wave passed by filter $Ft_i$. Another gate $Pt_i$ normally blocks transmission of this voltage to talking conductor $c$.

Gate $Pt_i$ controlled by a circuit $Dt_i$ which in turn is under the control of a routing switch $CCt_i$. The switches $CCt_1$ to $CCt_n$ and the gate control circuits $Dt_1$ to $Dt_n$ represent respective stages of a counting chain which also includes a starting circuit AV$t$controlled by pulse A (FIG. 4) from conductor $a$. Each counting shape further comprises a flip-flop, such as element $Mt_i$, which controls the associated switch $CCt_i$ to determine whether the gate control $Dt_i$ of this particular counting stage is to be activated or bypassed. The bypassing output of switch $CCt_i$ and the output of gate control $Dt_i$ are joined in an OR circuit $Ot_i$ which produces the input for the next following stage. Gate control $Dt_i$ also has an input connected to lead $b$ in order to receive therefrom the stepping pulses B.

In addition to the counting chain $CCt_1-CCt_n$ and $Dt_1-Dt_n$, the transmitting section of the terminal includes a preselection chain comprising switches $SCt_1$—$SCt_n$ preselector stages $PSt1$—$PSt_n$. Switch $SCt_i$ controls the stage $PSt_i$ by its first output and has its second output, bypassing that stage, connected to an OR circuit $Ot_i''$ which also receives the output of preselector stage $PSt_i$, the arrangement being analogous to that of the associated counting stage. A further input of preselector circuit PS$ti$ is connected to a bus bar $b'$ which forms an extension of conductor $b$, being separated from it by a gate B$t$ under the control of a flip-flop A$t$. The latter flip-flop is set by the output of the final OR circuit $Ot_n'$ of the counting chain and is periodically reset by the pulse A on conductor $a$.

Flip-flop $Mt_i$, which applies a distribution signal to an outgoing address lead $j_i$ having been set by a pulse from the corresponding preselector PS$ti$, can be reset by the pulse R (FIG. 4) from lead $r$ if this pulse clears an associated time-constant network $TCt_i$ under conditions described hereinafter. network $TCt_i$ also receives input signals from gate control $Dt_i$ and from a comparison circuit D, e.g. a differential amplifier, which is common to all the stages and works through a gate PD into a threshold device SG having its output lead $sg$ connected in parallel to all the time-constant networks $TCt_i$—TC$tn$.

The receiving section of the terminal includes a counting chain with switches $CCr_i-CCr_n$ and gate-control circuits $Dr_1-Dr_n$ similar to the aforedescribed counting chain of the transmitting section. Switch $CCr_i$ is controlled by a flip-flop $Mr_i$ which is set by a distribution signal from incoming address lead $h_i$ and is periodically reset by the synchronization and cancellation signal R on lead $r$. Gate control circuit D$ri$ is further triggerable by stepping pulses E from lead $e$. A starting circuit AV$r$receives a gating impulse G from conductor $g$, this pulse also opening a gate PC$ri$ through which signals from a storage circuit $CMr_i$ are delivered to filter F$ri$ for reconstitution into a low frequency sinusoidal wave. Storage circuit CM$ri$, which is similar to circuit CM$ti$ in the transmitting section, is energized from talking conductor $f$ via a gate P$ri$ controlled by the associated counting stage D$ri$.

The output lead $dri$ of circuit D$ri$ is extended to a control electrode of a gate $P_i'$ which passes the signal from conductor $f$ to a pair of integrating networks $I_i'$ and $I_i''$ connected in parallel, network $I_i'$ having a relatively short time constant (e.g. of about 10 milliseconds) whereas network $I_i''$ has a relatively long time constant (e.g. on the order of 1 second). The output of integrating circuit $I_i'$ is applied via a gate $P_i''$ and an OR circuit OD to one input of comparator D whose other input is energized directly from conductor $c$; gate $P_i''$ is controlled, in turn, by the output of integrating network $I_i''$.

For the internal construction of certain of the above-described elements, not relevant to the present invention, reference may be made to the aforementioned application Ser. No. 636,164. Thus, network $TCt_i$ may comprise a first AND gate with inputs connected to leads $dt_i$ and $sg$ and working into an RC integrating circuit, the latter feeding through an inverter a second AND gate also receiving the cancellation signal (R) from lead $r$. Two similar integrating circuits, representing the networks $I_i'$ and $I_i''$, are fed in parallel from the output of gate $P_i'$ and AND circuit with inputs connected to leads $dr_i$ and $f$ and deliver their respective outputs to two of three inputs of another AND circuit constituting the gate $P_i''$, an inverter being inserted between the latter circuit and network $I_i''$, the third input of this AND circuit is tied to lead $dt_i$. Starting circuits AV$t$and AV$r$ comprise each a flip-flop settable by pulses A or G on lead $a$ or $g$ and resettable by pulses B or E on lead $b$ or $e$, respectively. A differentiation circuit in the output of this flip-flop generates a first counting pulse upon the resetting thereof. Switch $CCt_i$ (or $CCr_i$), i), receiving this starting pulse either directly or through bypass lines of preceding stages, comprises a pair of gates which are alternately unblocked according to the state of the associated flip-flop $Mt_i$ (or $Mr_i$) to route the pulse either into or around the control unit $Dt_i$ (or $Dr_i$). The latter unit includes a flip-flop having an AND gate in its setting input and a NAND gate in its resetting input, each of these gates having one input connected to lead $b$ (or $e$ ) and another input connected to the first of the two switch gates for receiving the counting pulse therefrom. In the conductive state of this switch gate, the arrival of a counting pulse at switch $CCt_i$ (or $CCr_i$) sets the flip-flop of unit $Dt_i$ (or $Dr_i$) in view of its invariable coincidence with a stepping pulse B (or E) on lead $b$ (or $e$). The next stepping pulse, unaccompanied by a counting pulse fed in by the switch, resets the flip-flop and generates an outgoing counting pulse with the aid of a differentiation circuit in its output, thus causing an analogous operation in a subsequent stage.

Elements $SCt_i$ and $PSt_i$ in the preselection chain are similar to units $CCt_i$ and $Dt_i$ in the counting chain. The occurrence of a stepping pulse B' on lead $b'$, under conditions described in detail hereinafter. resets the flip-flop of the preselector element last set to generate a test pulse which is bypassed around all following preselectors $PSt_i$ whose associated flip-flops $Mt_i$ are set and which sets the first preselector in its path lacking this criterion; the next pulse B' then resets the last-mentioned preselector and generates another test pulse which travels further along the closed loop $PSt_1$—$PSt_i$—$PSt_n$—$PSt_1$.

The appearance of a cancellation or resetting pulse R (FIG. 4) on lead *r* unblocks the bypass gates of all storage units $CMt_1$—$CMt_n$, $CMr_1$—$CMr_n$ to discharge their respective condensers.

Coder 101 has its output connected to lead *c'* through a junction circuit 102 which also receives dial pulses and other ancillary signals from a conductor 103 and has a further input lead *j* sequentially connected, through a scanner 104, to all the address leads $j_1$—$j_n$ during an initial allocation period MD (see FIG. 4) characterized by the presence of a pulse Z on a lead *z*, the scanner being stepped by clock pulses K on a lead *k* to generate an outgoing distribution signal J on lead *c'*. Similarly, an incoming distribution signal H on lead *f'* is separated by a circuit 202 from the message codes, which are fed to decoder 201, and is distributed by a circuit 204 (also under the control of pulses Z and K) to the appropriate address leads $h_1$—$h_n$ in order to set the corresponding flip-flops $Mr_1$—$Mr_n$. The ancillary signals are directed by separator 302 onto a further conductor 203.

Figure 4:
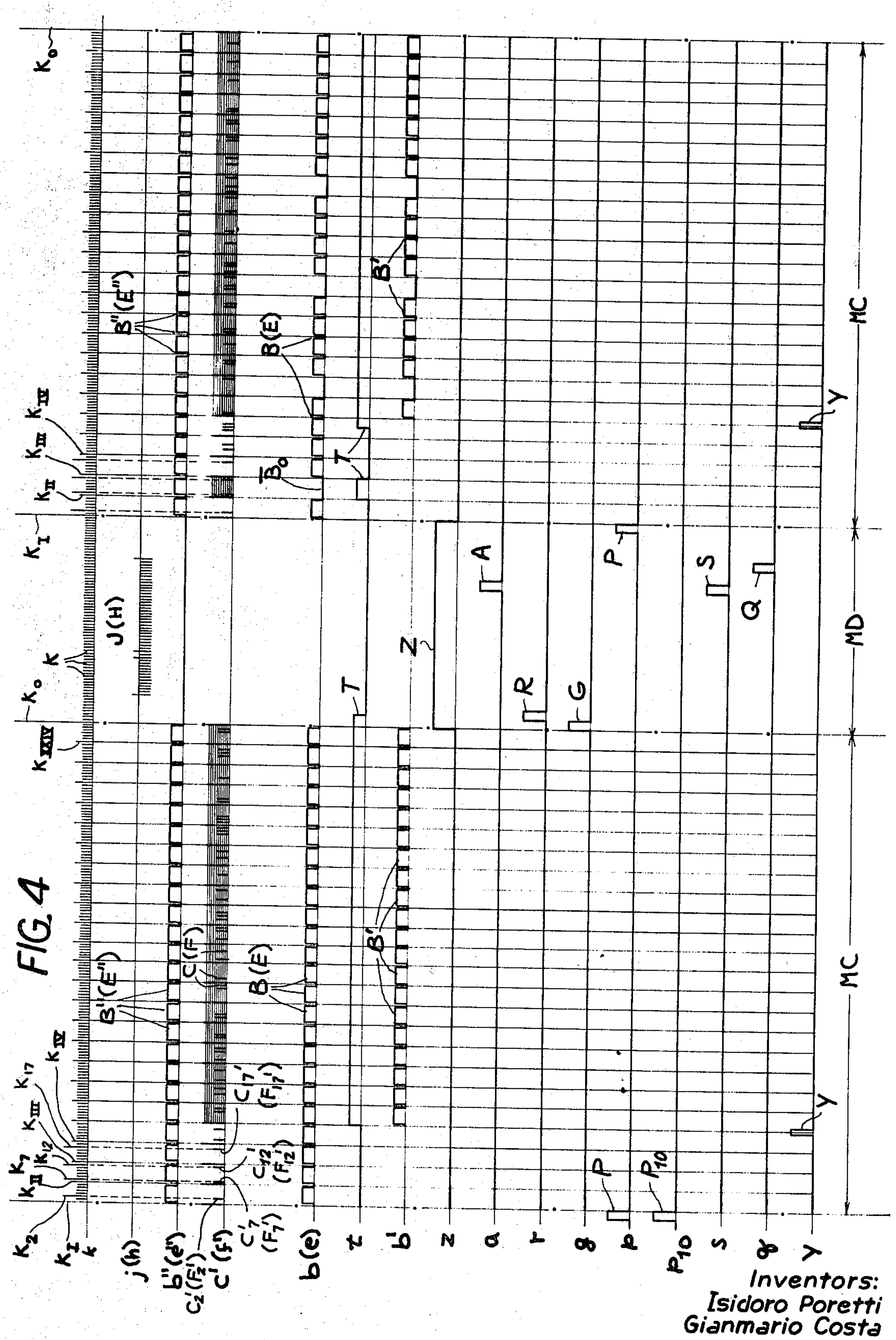
FIG. 4 is a timing diagram illustrating the sequence of pulse generation and signal transmission in the system of the preceding FIGS.

The system so far described operates as follows (assuming $n = 48$):

As shown in FIG. 4, a frame or operating cycle of the timer is defined by a succession of 240 clock pulses K on lead *k*, starting with a pulse $K_o$. The frame, whose overall duration may be 100 $\mu s$, is subdivided into two periods, i.e. a relatively short first period MD for the transmission of the distribution signal and a relatively long second period MC, starting with a clock pulse $K_I$, for the transmission of intelligence signals. The latter period consists of $m'' = n/2$ (here 24) time slots or channels each having a width of seven clock pulses K, beginning with pulses $K_I$, $K_{II}$, $K_{III}$, $K_{IV}$, etc.

At the beginning of a frame there occurs the synchronization signal R on lead *r* to discharge all the storage circuits $CMt1$—$CMt_n$ and $CMr_1$—$CMr_n$, to reset all the flip-flops $Mr_1$—$Mr_n$ of the counting chain in the receiving section, and to reset certain of the corresponding flip-flops $Mt_1$—$Mt_n$ in the transmitting section under conditions explained further on. Immediately thereafter, scanner 104 tests all the outgoing address leads $j_l$—$j_n$ to produce a pulse train J, as shown on line *j*, in which pulses of a given polarity (here positive) identify all the transmitting flip-flops not reset. At the same time, a similar pulse train H as illustrated on line *h* is received from the trunk and, via distributor 204, selectively energizes certain of the incoming address leads $h_1$—$h_n$ according to the pattern of positive pulses in that train. As a result, the corresponding receiving flip-flops $Mr_1$—$Mr_n$ are now set to activate the associated counting stages.

During the same period MD, a sampling pulse A appears on lead *a* and, in momentarily unblocking all the gates $PCt_1$—$PCt_n$, causes the recharging of all the storage circuits $CMt_1$—$CMt_n$ which had previously been discharged.

Upon the beginning of frame interval MC, a series of stepping pulses B and E appear on leads *b* and *e*, respectively. If the flip-flop $Mt_1$ of the first stage has been set, the counting pulse generated by element $AVt$ in response to the first stepping pulse (which resets the flip-flop thereof) is applied to gate control $Dt_1$ concurrently with this stepping pulse so that gate $Pt_1$ is opened to communicate the contents of storage circuit $CMt_1$ to conductor *c*. If, on the other hand, flip-flop $Mt_1$ had been reset, switch $CCt_1$ would have been in its bypass condition and the counting pulse would have reached the first gate control (e.g. $Dt_i$) whose routing switch was in its activating condition, i.e. wherein the feed gate rather than the bypass gate was unblocked by the associated flip-flop $Mt_i$. Thus, the flip-flop of this control unit is set to energize its output lead $dt_i$. The next stepping pulse B, being unaccompanied by a counting pulse from a preceding stage, resets that flip-flop with consequent generation of another counting pulse in the output of stage $Dt_i$ to help activate the next counting stage whose flip-flop has been set.

In like manner, the stepping pulses E applied to unit $AVr$ and to the gate controls in the counting chain of the receiving section advance that chain while skipping all those stages thereof whose flip-flops $Mr_1$—$Mr_n$ had not been set by the distribution signal H from the remote terminal.

The coder 101 translates the voltage samples on conductor *c* into combinations of code pulses C which, in the known manner, represent the digital equivalent of the voice signals to be transmitted. Conversely, the decoder 201 derives voltages of varying magnitude from the different code combinations F arriving over conductor *f'*. These code combinations C and F may be accompanied, as disclosed in the prior U.S. applications referred to, by invariable timing pulses which have been shown slightly larger than the digital pulses for purposes of distinction.

The number *m* of stepping pulses B and E in each frame is variable and equal to or less than $n/2$. Let us assume that the number of activated counting-chain stages in the transmitting section equals *w* which, in turn, is less than *m*. Upon the $w^{th}$ stepping pulse, therefore, a counting pulse will emerge from the OR circuit $Ot_n'$ of the last stage and will set the flip-flop $At$ which thereupon opens the gate $Bt$ so that all further stepping pulses B are now also transmitted to bus bar *b'* where they appear as pulses B' to advance the preselection chain $PSt_1$—$PSt_n$ in essentially the manner described with reference to the counting chain. The stages of this preselection chain are cyclically interconnected and the routing switches $SCt_1$—$SCt_n$ thereof are in their activating condition whenever the corresponding flip-flop $Mt_1$—$Mt_n$ is not set; thus, pulses B' cause the successive activation of $(m- w)$ preselector stages, skipping all those stages whose counterparts in the counting chain are active. The activation of any such preselector stage sets the corresponding flip-flop $Mt_1$—$Mt_n$ at a point of the cycle prior to the occurence of cancellation signal R; after the last pulse B, the preselection chain remains in the condition last established therein for further advancement during a subsequent cycle in which $w < m$.

Finally, a pulse G on conductor *g* occurring just before pulse R opens all the gates $PCr_1$—$PCr_n$ to transmit the stored voltages from circuits $CM_1$—$CMr_n$ via filters $Fr_1$—$Fr_n$ to the respective hybrid coils $H_1$—$H_2$ of a maximum of *m* subscriber lines as determined by the distribution signal H received at the beginning of the frame.

Differential amplifier D has an output whenever the difference between the signal levels on conductors *c* and *f* (the latter as integrated in circuits $I_1'$—$I_n''$) is positive. With these integrating circuits designed to charge rapidly (i.e. in the period of approximately one frame) but to discharge over a considerably longer period (e.g. of 10 ms.), the charge thereon represents the cumulative signal voltage from a large number of operative cycles; this integrated voltage is suitably reduced in the input of amplifier D to represent an average signal level comparable to that existing on conductor *c* if the voltage of the latter is due exclusively to echoes of incoming signals reflected by the corresponding hybrid coil. In the presence of original outgoing signals on conductor *c*, therefore, the output of amplifier D will be energized to open the gate PD so that the voltage of conductor *c* is transmitted to threshold device SG. If this voltage is sufficiently higher than the average noise level to clear the threshold, the potential on lead *sg* allows a pulse from the flip-flop in circuit $Dt_i$ to pass the first AND gate in network $TCt_i$ and to begin to charge the RC network therein. After several frames this charge is sufficient to block the second AND gate in this network so that cancellation pulse R on lead *r* can no longer pass through to reset the flip-flop $Mt_i$ if the same had been previously set by one of the pulses B'. Conversely, this charge will decay only after several cycles (if the subscriber on line $L_i$ has ceased talking) whereby gate control $Dt_i$ will not be deactivated during cycles between syllables.

It may be advantageous to make deactivation of counting-chain stages $Dt_1$—$Dt_n$ independent of relative signal strength on conductors $c$ and $f$ if, for example, a message arriving from the remote terminal consists of data transmitted by a machine which is intended to respond to control signals from the local subscriber. This is accomplished with the aid of integrating circuits $I_1''$—$I_n''$ which, if sufficiently charged, blocked the respective gates $P_1''$—$P_n''$ so as to inhibit the transmission of signals to OR circuit OD in response to pulses or leads $dt_1$—$dt_n$. Integrating circuit $I_1''$—$I_n''$, while charging just as rapidly as circuits $I_1'$—$I_n'$, may discharge at a rate on the order of 1 second so as not to become effective during ordinary conversation.

The stepping pulses B on lead $b$ are derived, in accordance with our present improvement, from a scrambler CM$t$ receiving, on its several inputs, an invariable train of 24 stepping pulses B'' per frame (lead $b''$), certain code combinations C (from lead $c'$) to be stored for an immediately following frame, the timing signal Z (lead $z$) coinciding with the allocation period MD, the synchronizing pulse R (lead $r$), and various control pulses Q, S, P, P10 (leads $q$, $s$, $P$, $p10$), all as shown in FIG. 4 and described in greater detail hereinafter. Scrambler CM$t$ is controlled by an associated random selector ME$t$ which, besides being connected to leads $p$ and $c'$, also receives a succession of 24 clock pulses $K_1$, ... $K_x$, ... $K_{24}$ on corresponding conductors $k1$, ... $k_x$, ... $k_{24}$ emanating from the timer. Apart from delivering stepping pulses B on lead $b$ scrambler CM$t$ develops an inverted signal on a second output lead $\bar{b}_0$ whenever the pulse train on lead $b$ has a gap due to the suppression of an original stepping pulse B'' by the selector ME$t$. Lead $\bar{b}_0$ is connected to one input of an OR gate OG having another input tied to the "set" output of a flip-flop BN and working through a lead $t$ into one input of an AND gate AG; a second input of the latter gate receives the inverted timing signal $\bar{Z}$ on a lead $\bar{z}$ while a third input is tied to the output of a noise code generator NG having an input tied to lead $k$ which carries the clock pulses K. Flip-flop BN is set by a spike Y on a lead $y$, i.e. the output conductor of OR gate $Ot_n'$, and is periodically reset by the synchronizing pulse R on lead $r$.

The receiving section of FIG. 1 ($b$) includes a complementary unscrambler CM$r$ of substantially the same construction as scrambler CM$t$, described hereinafter with reference to FIG. 2, except for the omission of the second output lead carrying the inverted signal. Thus, the sole output of unit CM$r$ is tied to lead $e$ while its inputs are identical with those of unit CM$t$ except for the replacement of leads $b''$ and $c'$ by leads $e''$ and $f'$, respectively. An associated random selector ME$r$ corresponds to the unit ME$t$ of FIG. 1 ($a$) and has the same input leads $p$ and $k_1$ ... $k_{24}$, being also connected to conductor $f'$ in lieu of conductor $c'$.

Figure 2:
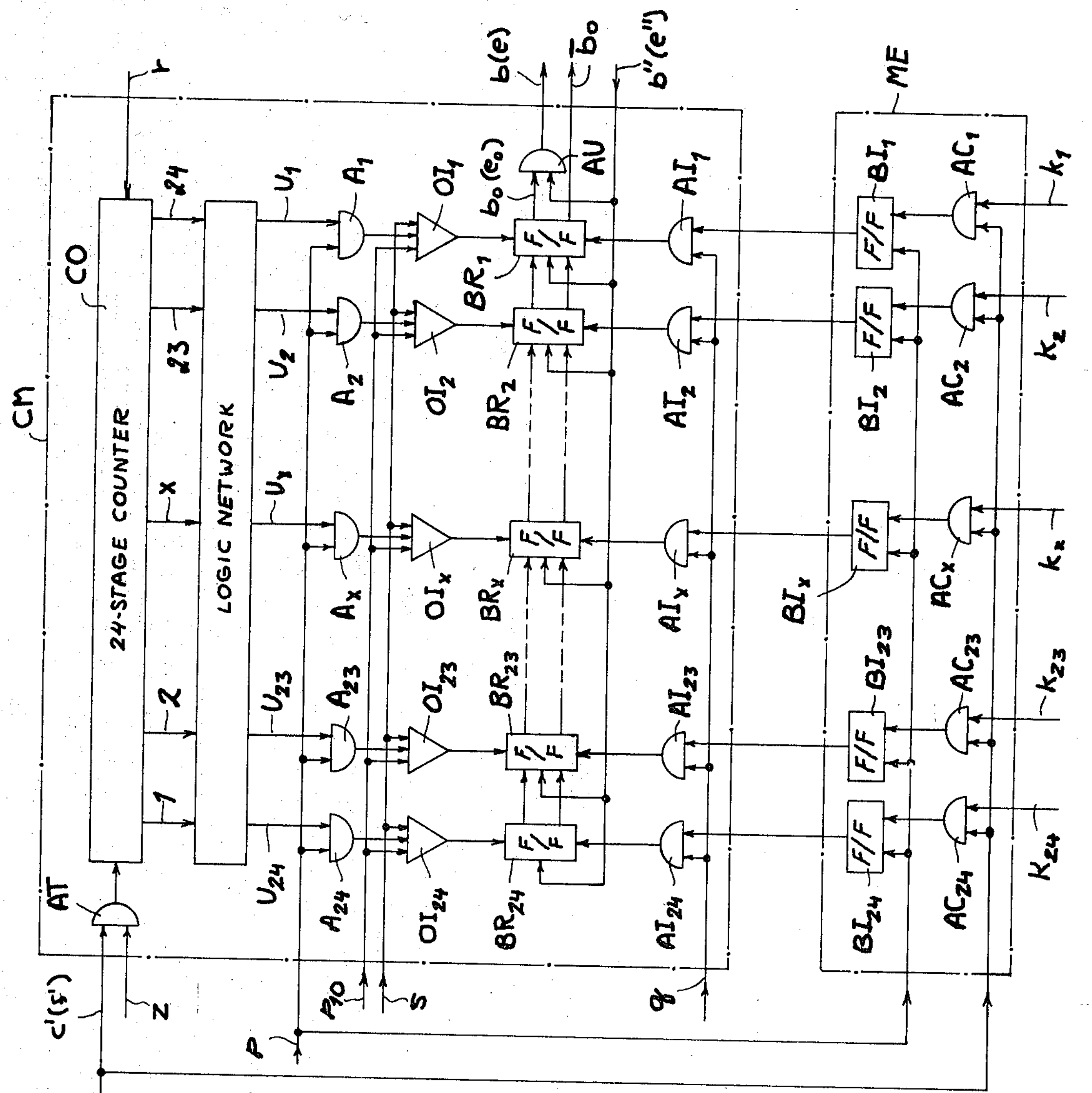
FIG. 2 is a more detailed circuit diagram of certain units forming part of the system of FIGS. 1 (*a*) and 1 (*b*)
Figure 3:
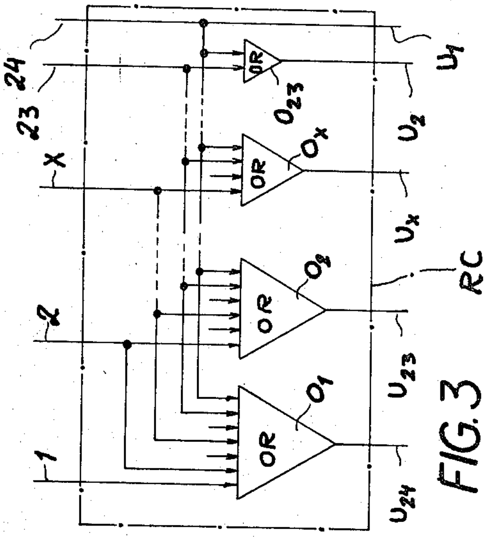
FIG. 3 is a detailed diagram of a network shown in block form in FIG. 2.

In FIG. 2 we have shown two units CM, ME representative of the units CM$t$, CM$r$ and ME$t$, ME$r$ of FIGS. 1 ($a$) and 1 ($b$). Unit CM comprises a 24-stage pulse counter CO connected to the output of an AND gate AT having a first input tied to lead $c'$ (or $f'$) and a second input tied to lead $z$. Counter CO has 24 output leads, designated 1, 2, ... $x$, ... 23, 24, extending to a logic network RC which, as shown in detail in FIG. 3, consists essentially of a set of 23 OR gates $O_1$, $O_2$, ... $O_x$, ... $O_{23}$ with a progressively diminishing number of outputs. Thus, gate $O_1$ has 24 inputs connected to all the incoming leads 1—24; gate $O_2$ has 23 inputs, lacking a connection to lead 1, and so on. In general, the number of inputs of any OR gate $O_x$ equals $m'' + 1 - x$, with $m'' = n/2 = 24$. The output leads of OR gates $O_1$—$O_{23}$ have been designated, in the reverse order, $u_{24}$, $u_{23}$, ... $u_x$, ... $u_2$, a 24$^{th}$ output lead $u_1$ being tied directly to input lead 24.

Counter CO, which is periodically zeroized by the synchronizing pulse R, advances in response to the significant pulses in the distribution signal J (or H) on conductor $c'$ (or $f'$) so that, in response to $x$ such pulses, its outputs lead $x$ is energized. Network RC converts this state of energization into a voltage on a corresponding number of output leads, i.e. one such lead ($u_{24}$) if conductor 1 is energized, two such leads ($u_{24}$, $u_{23}$) if conductor 2 carries voltage, and so on. Thus, the number of significant pulses in the distribution signal is translated by circuits CO and RC into a corresponding number of energized leads $u_{24}$ ... $u_1$.

The 24 output leads of network RC terminate at respective AND gates $A_{24}$, $A_{23}$, ... $A_2$, $A_1$ each also having another input connected to lead $p$; these AND gates work into respective OR gates $OI_{24}$, $OI_{23}$, ... $OI_x$, ... $OI_2$, $OI_1$ with second inputs connected to lead $s$ and third inputs connected to lead $p_{10}$. A set of flip-flops $BR_{24}$, $BR_{23}$, ... $BR_x$, ... $BR_2$, $BR_1$ constitutes a 24-stage shift register whose stages are settable in parallel from the corresponding OR gates $OI_{24}$—$OI_1$, this register being shiftable by stepping pulses B'' (or E'') fed in over lead $b''$ (or $e''$). To reset the register stages, we provide a corresponding set of AND gates $AI_{24}$, $AI_{23}$, ... $AI_x$, ... $AI_2$, $AI_1$ having first inputs individually connected to respective outputs of random selector ME and having second inputs connected in parallel to lead $q$. The final register stage $BR_1$ works via a lead $b_0$ (or $e$ O) into an AND gate AU also connected to lead $b''$ (or $e''$) to generate pulses B (or E) on lead $b$ (or ); lead $b_0$ extends from the "reset" output of this stage.

Selector ME comprises a set of flip-flops $BI_{24}$, $BI_{23}$, ... $BI_x$, ... $BI_2$, $BI_1$ whose "set" outputs terminate at the AND gates $AI_{24}$—$AI_1$ of unit CM and whose setting inputs are connected to the outputs of respective AND gates $AC_{24}$, $AC_{23}$, ... $AC_x$, ... $AC_2$, $AC_1$, their resetting inputs being tied to conductor $p$. AND gates $AC_{24}$ etc. have first inputs tied to clock conductors $k_{24}$, $k_{23}$, ... $k_x$, ... $k_2$, $k_1$ and second inputs connected in parallel to lead $c'$ (or $f'$). Since clock conductors $k_1$—$k_{24}$ serve to impress a random pattern of energization upon the associated flip-flops $BI_1$—$BI_{24}$, the order in which these conductors are connected to AND gates $AC_{24}$—$AC_1$ is immaterial but should, of course, be identical for both selectors ME$t$ and ME$r$.

Referring again to FIG. 4, we shall now describe the complete operation of our improved system.

The transmission period MC of, say, every 10th frame is initiated by a pulse $P_{10}$ on lead $p_{10}$ coinciding with a pulse P on lead $p$ which recurs during each frame. Pulse $P_{10}$ clears the shift registers $BR_{24}$—$BR_1$ of units CM$t$ and CM$r$ (the same operation taking place concurrently at the remote terminal) by setting all the flip-flops thereof so that each register stage contains the bit "1." Immediately thereafter, stepping pulses B'' begin to arrive on lead $b''$ to read out the contents of the register stages of scrambler CM$t$; since they have all been set, a pulse B appears on output lead $b$ for every pulse B'' fed in, the number $m$ of these pulses thus equaling the maximum number $m'' = 24$.

Let us assume by way of example that, as shown at left in FIG. 4, there are only four active subscriber lines in the counting chain $Dt_1$—$Dt_n$ of FIG. 1 ($a$) during the interval MC immediately following the occurrence of clearing pulse $P_{10}$ and that the voice signals present on conductor $c$ during the corresponding first four stepping pulses B, B'' give rise to code pulses $C_2'$, $C_7'$, $C_{12}'$ and $C_{17}'$ on conductor $c'$ (corresponding to incoming pulses $F_2'$, $F_7'$, $F_{12}'$ and $F_{17}'$ on conductor $f'$ of the remote terminal) representing respective code combinations C (or F) transmitted over the first four of the available 24 time intervals or channels. The invariable timing pulses of these four code combinations coincide with clock pulses $K_I$, $I_{II}$, $I_{III}$, $K_{IV}$ separated by groups of six intervening clock pulses each, the 24 intervening clock pulses of the first four channels being respectively applied to leads $K_1$—$k_{24}$ of random selectors ME$t$ and ME$r$. It should be noted that, in the numbering of these latter clock pulses, the starting pulses $K_I$—$K_{IV}$ are disregarded. Thus, code pulses $C_2'$, $C_7'$, $C_{12}'$ and $C_{17}'$ respectively coincide with clock pulses $K_2$, $K_7$, $K_{12}$ and $K_{17}$, shown enlarged in FIG. 4 for distinctiveness. Upon the occurrence of the respective clock pulses, the second, seventh, 12th and 17th flip-flops of the group $BI_1$—$BI_{24}$ (counting from the right in FIG. 2) are set in selector ME$t$.

At the end of the fourth sampling interval, the counting pulse traversing the chain $Dt_1$—$Dt_n$ in FIG. 1 ($a$) has reached the OR gate $Ot_n'$ and appears as a spike Y on conductor $y$ to set the flip-flop BN so as to energize the first input of AND gate AG. Since pulse Z exists only during the interval MD, lead $\bar{z}$ at the second input of that AND gate is also energized at this time so that the output of noise generator NG, in the form of code pulses coinciding with clock pulses K on lead $k$, is passed via junction 102 to outgoing conductor $c'$. The corresponding noise signals, basically indistinguishable from the other coded signals C (or F), have been identified in FIG. 4 by horizontal shading and coincide with pulses B′ appearing on lead $b'$ to advance the preselector chain $PSt_1$—$PSt_n$ as described above. Thus, message signals are conveyed over all the 24 channels of the system during this period, yet only the first four thereof are genuine.

At the remote terminal, the receiving selector ME$r$ has its flip-flops $BI_1$—$BI_{24}$ preset in the same manner as selector ME$t$ by the arriving code pulses $F_2'$, $F_7'$, $F_{12}'$ and $F_{17}'$. Since, however, the preceding distribution signal H identified only four called subscribers by setting the corresponding flip-flops in the chain $Mr_1$—$Mr_n$, all the arriving noise signals in channels Nos. 5—24 are ineffectual despite the readout of a full complement of 24 stepping pulses E on lead $e$.

After the gating pulse G has communicated the message samples to the designated subscribers, synchronizing pulse R clears the counters CO of units CM$t$ and CM$r$ at both terminals. The allocation period MD of the next frame is marked by the appearance of timing pulse Z on lead $z$, with simultaneous blocking of gate AG by the disappearance of the complement $\bar{Z}$ on lead $z$ so that the transmission of noise signals ceases. Counters CO of scrambler CM$t$ at the proximal terminal and of unscrambler CM$r$ at the remote terminal are now receptive to the distribution signal J (H) transmitted at this time over the line.

Let us assume that the four calling subscribers of the preceding frame are still active and that their positions in the 48-channel spectrum are as indicated by the four positive pulses of signal J (H) shown in FIG. 4. Counter CO of scrambler CM$t$ responds to these four pulses by energizing its No. 4 output lead so that the first four output leads $u_{24}$, $u_{23}$ etc. (counting from the left) of logic network RC also carry voltage. At some point during period MD, e.g. concurrently with sampling pulse A, a pulse S appears on lead $s$ to set all the stages of shift register $BR_{24}$—$BR_1$; shortly thereafter, a quenching pulse Q on lead $q$ resets those register stages whose counterparts in the series $BI_{24}$—$BI_1$ of selector ME$t$ had been set as previously described, i.e. stages Nos. 2, 7, 12, and 17 under the conditions here assumed. Finally, upon termination of the distribution signal, a pulse P on lead $p$ resets all the set flip-flops of selector ME$t$ and, simultaneously, opens those AND gates in the group $A_{24}$—$A_1$ whose other inputs are connected to energized output leads of network RC, specifically here the first four output leads from the left, so that the first four register stages $BR_{24}$, $BR_{23}$ etc. would again be set if any of them had been reset by pulse P.

Under the assumed conditions, therefore, register stage $BR_2$ and three further stages (Nos. 7, 12 and 17, counting from the right) are reset while all the others remain set. The setting of these four stages by the logic network RC ensures that, regardless of the instantaneous operating pattern of random selector ME$t$, there will be enough register stages with the digit "1" inscribed therein (i.e. with their flip-flops set) to provide stepping pulses B for all the active subscriber lines.

After the cessation of pulse Z, there begins a new transmission period MC during which another train of stepping pulses B″ appears on lead $b''$. *The first pulse B″ reads out the state of flip-flop $BR_1$, here "1," so that a pulse B is generated in the output of AND gate AU. Flip-flop $BR_1$ now receives the digit of stage $BR_2$, here "O," so that the next input pulse B″ does not produce an output pulse B″ but gives rise to an inverted pulse $\bar{B}_0$ on lead $\bar{b}_0$* hereby opening the gate AG and applying a noise code to line conductor $c'$. The next four pulses B″ again produce pulses B on lead $b$, but only the first three thereof cause the transmission of true message codes since thereafter the end of the counting chain in FIG. 1 ($a$) is reached and the next pulse already is passed through gate At to lead $b'$ to create a test pulse B′. At the same time, as described above, flip-flop BN—which had been reset by pulse R at the beginning of the cycle—is set once more by pulse Y so that the transmission of noise codes continues to the end of the frame. In FIG. 4, we have also shown a signal T, appearing on lead $t$ of FIG. 1 ($a$), which opens the AND gate AG for transmission of the output of noise code generator NG.

At the receiving terminal, the operation of selector ME$r$ in response to the received distribution code pulses $F_2'$, $F_7'$, $F_12'$, $F_{17}'$ generates a train of pulses E, duplicating the pulse train B at the transmitter, on lead $e$ so that only the genuine message codes are utilized.

Meanwhile, following the clearing of selectors ME$t$ and ME$r$ by pulse P, the flip-flops thereof are again set in a random pattern depending on the code pulses of the first four channels; in the example chosen, this includes the noise code occurring in channel No. 2 during the instant frame.

It will be noted that the second transmitting period MC (at right in FIG. 4) contains the same total number (24) of signal codes, including four true message samples, but that the position of the latter codes has been shifted by the intervention of a spurious code in channel No. 2. With different code combinations continuously occurring in the first four channels used in the present case to establish the selection pattern, the relative position of these signal codes is subject to further shifts in an entirely unpredictable manner.

The recurrence of the clearing pulse $P_{10}$ after the 10th frame introduces a pause in the modification of the stepping-pulse train by scrambler ME$t$ so as to restore the system to its starting condition as described above.

As noted in application Ser. No. 636,264, circuits AV$t$ and AV$r$ could be in the form of monostable multivibrators, with omission of their connection to conductors $b$ and $e$, respectively.

We claim:

1. In a two-way communication system comprising a trunk line with signal paths for transmission in opposite directions, a terminal at each end of said trunk line having a transmitting section and a receiving section, a group of $n$ subscriber lines with outgoing and incoming branches respectively terminating at said transmitting section and said receiving section, timer means for periodically sampling the signal level on each of said outgoing branches, first switching means at said transmitting section for sequentially connecting a maximum number $m''=n/2$ of outgoing branches to said trunk line during each operating cycle of said timer means, second switching means at said receiving section for sequentially connecting to $m''$ incoming branches to said trunk line during successive time intervals of each operating cycle under the control of a distribution signal from the opposite terminal, and level-responsive means for enabling said first switching means to connect a variable number $w$ of outgoing branches to said trunk line during a transmission period of the cycle following an allocation period reserved for the sending of said distribution signal to the opposite terminal, the combination therewith of a source of $m''$ stepping pulses constituting an original pulse train generated during said transmission period, scrambler means at said transmitting section for foreshortening said original pulse train by random suppression of certain pulses thereof to produce a modified train of $m$ stepping pulses wherein $m$ is at least equal to $w$, first selector means at said transmitting section for establishing a random pattern of suppression in said scrambler means, first circuit means for delivering said modified train to said first switching means for successively delivering message signals from said $w$ outgoing branches to said trunk line during said transmitting period, noise generating means controlled by said scrambler means for delivering spurious signals to said trunk line during gaps in said modified train due to suppressed original stepping pulses, unscrambler means at said receiving section for eliminating said spurious signals from signals received over said trunk line, second selector means at said receiving section for controlling said unscrambler means in step with the pattern of suppression of said scrambler means at the transmitting section of the opposite terminal, and second circuit means at said receiving section for directing genuine message signals from said trunk line to a number $w$ of called subscribers identified by said distribution signal.

2. The combination defined in claim 1 wherein said first switch means comprises a counting chain of $n$ stages triggerable in a predetermined order by said $m$ stepping pulses to open a transmission gate for passing a signal sample of a respective outgoing branch, routing means for selectively bypassing any of said stages whereby the transmission gate thereof remains closed, and a preselector chain of $n$ cyclically interconnected stages for preparing selected stages of said counting chain under the control of said level-responsive means for triggering in an immediately following cycle, the stages of said preselector chain being connected for successive actuation by supernumerary $(m—w)$ stepping pulses generated during said transmission period.

3. The combination defined in claim 2 further comprising control means responsive to said supernumerary stepping pulses for delivering said spurious signals from said noise generating means to said trunk line also during preselection of further stages of said counting chain.

4. The combination defined in claim 1 wherein said signal paths include coding means at said transmitting section and decoding means at said receiving section, said first and second selector means each including a set of switching devices responsive to individual bits of code combinations into which signals transmitted during certain of said time intervals are converted by said coding means.

5. The combination defined in claim 4 wherein said switching devices are provided with connections to said trunk line closable by said timer means during the initial time intervals of said transmission period, the total number of digital positions in said initial time intervals being equal to $m/2$.

6. The combination defined in claim 4 wherein said scrambler means and unscrambler means each include a counter for subscriber identifying pulses in said distribution signal and circuitry controlled by said counter for actuating a number of said switching devices equal to the count of said subscriber identifying pulses independently of the operating pattern of said first and second selector means.

7. The combination defined in claim 6 wherein said scrambler means and unscrambler means each comprises a shift register with $m''$ stages, said switching devices numbering $m''$ and being respectively connectable to the stages of said register, said circuitry including a logic network inserted between the register stages and said counter.

8. The combination defined in claim 7 wherein said logic network includes $(m'' - 1)$ OR gates with progressively diminishing numbers of inputs connected to corresponding combinations of $(m'' - 1)$ stage outputs of said counter and working into respective register stages, a further stage output of said counter being connected to a final register stage.

9. The combination defined in claim 8 wherein said final register stage at said transmitting section is provided with a first output for generating said modified train of stepping pulses and with a second output for producing an inverted pulse to control said noise generating means.

10. The combination defined in claim 4 further including a generator of clearing pulses for periodically restoring all said switching devices to a normal condition irrespectively of said code combinations, the recurrence period of said clearing pulses being substantially greater than said operating cycle.